United States Patent [19]

Miller, Sr. et al.

[11] Patent Number: 5,551,289
[45] Date of Patent: Sep. 3, 1996

[54] SERVO CONTROLLED AIRSPEED INDICATOR

[75] Inventors: Ronald M. Miller, Sr., Clearwater; Brian T. K. Nielson, Seminole, both of Fla.

[73] Assignee: Aerosonic Corporation, Clearwater, Fla.

[21] Appl. No.: 413,715

[22] Filed: Mar. 30, 1995

[51] Int. Cl.[6] .................................................. G01C 21/00
[52] U.S. Cl. .......................................... 73/182; 73/861.65
[58] Field of Search ...................... 340/971, 973, 340/978, 945; 73/861.65, 178, 179, 182

[56] References Cited

U.S. PATENT DOCUMENTS 3,577,195  5/1971  Clift .......................................... 340/945
4,319,333  3/1982  Hedrick .................................... 73/488
4,598,292  7/1986  Devino .................................... 340/973

*Primary Examiner*—Richard Chilcot
*Assistant Examiner*—Ronald Biegel
*Attorney, Agent, or Firm*—Honigman Miller Schwartz and Cohn

[57] ABSTRACT

A servo motor is coupled through an electric clutch to the needle on a mechanical airspeed indicator. The servo motor is controlled by a signal processor to position the needle to indicate airspeed based on a value calculated from static and pitot pressure indicated by output signals from a solid state transducer. The needle is also connected to an aneroid mechanism that positions the needle based on static and pitot pressure but which is overcome by the servo motor when the clutch is activated. The clutch is deactivated, allowing the aneroid mechanism to position the needle, if a fault is detected by the signal processor.

6 Claims, 2 Drawing Sheets

SERVO CONTROLLED AIRSPEED INDICATOR

TECHNICAL FIELD

This invention relates to the analog cockpit airspeed indicators that are used in aircraft, in particular, redundant airspeed indicators.

BACKGROUND OF THE INVENTION

In its simplest form, an aircraft airspeed indicator is a needle that moves relative to a graduated face roughly in proportion to incident air pressure sensed with a pitot tube. The pitot tube, the L-shaped probe often located on the fuselage near the cockpit, contains a static port and a pitot/dynamic pressure port. These two pressures sensed at those ports are applied to an aneroid mechanism that expands and contracts in relation to the dynamic pressure changes with changed airspeed, moving the needle. Reliable as the simple mechanical airspeed may be, redundancy is desirable. Redundancy can be achieved by a second mechanical altimeter, but a second altimeter would take up more dash board space and confuse the pilot's instrument scan.

DISCLOSURE OF THE INVENTION

Among the objects of the invention is to provide a self contained dashboard airspeed indicator that provides primary and backup airspeed readings in a way that is "invisible" to the pilot.

According to the invention, a signal processor is employed to determine the airspeed from the static and pitot pressure and provide a control signal to a servo motor that is connected to the needle and capable of overriding the aneroid tube to provide the airspeed indication. The servo motor is connected to the needle through a disengaging transmission, such as an electric clutch. If there is a power failure or another power supply fault suggestive of diminished accuracy in the electronically produced airspeed indication, the servo motor is disengaged from the needle, allowing the aneroid tube to control needle position.

The invention provides the benefits of a computer based analog airspeed indicator with a simple mechanical backup in a single case. A feature of the invention is that the electronic components can be installed in typical airspeed indicator case along with the servo motor.

Other objects, benefits and features of the invention will be apparent to one of ordinary skill in the art from the following discussion.

BEST MODE FOR CARRYING OUT THE INVENTION

Figure 1:
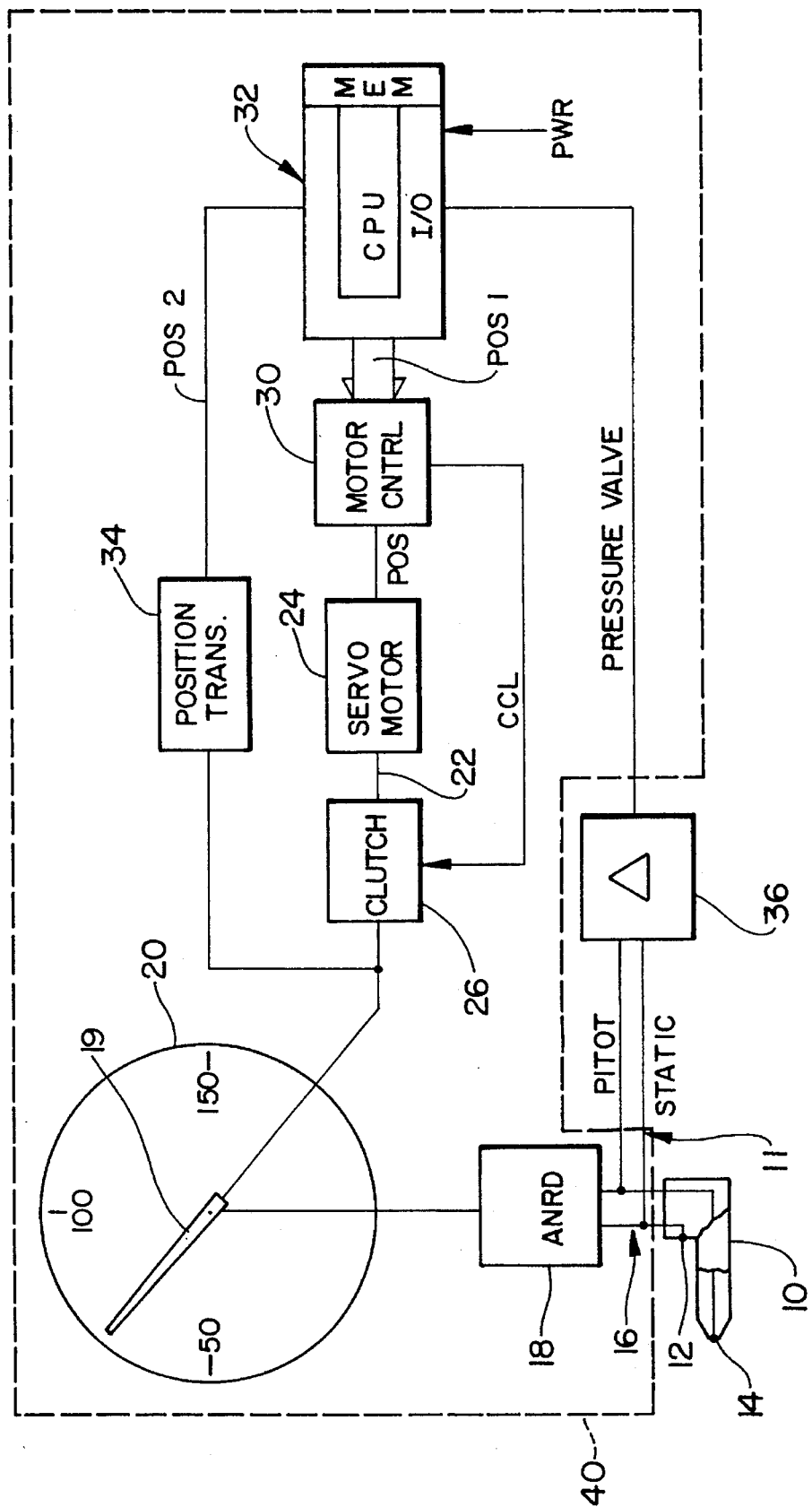
FIG. 1 is a block diagram of an airspeed indicator system embodying the present invention.

In the airspeed indicator system shown in FIG. 1, a pitot tube 10, normally found on an aircraft fuselage, contains a static pressure port 12 and a pitot or dynamic pressure port 14. These ports 12, 14 are connected over pressure lines 16 to a differential aneroid drive mechanism (ANRD) 18 that rotates a needle 19 relative to a graduated face or card 20, which should be assumed to be part of the typical airspeed instrument mounted in a cockpit dash board (not shown). The aneroid mechanism 18 rotates the needle in proportion to the difference between static pressure and pitot pressure-indicating airspeed. A drive shaft 22 from a servo 24 is connected through an electric clutch 26 to the needle 18. The clutch responds to an ON/OFF signal CCL, connecting the servo motor to the needle when the signal CCL is ON and disconnecting the motor from the needle when the signal CCL is OFF. The servo motor 24, part of a proportional control loop, is controlled by a servo motor control 30 that produces a position signal POS to operate the motor 24, causing it rotate left or right overriding the aneroid mechanism. The motor control 30 receives control signals from a signal processor 32 that includes typical components, such as a memory MEM to store data and program instructions, an input/output interface I/O to receive and output signals, and a central processing unit CPU to control operations by the signal processor 32. The motor control 30 supplies the CCL signal under the control of the signal processor 32, which also produces a signal POS 1 that controls the characteristics of the POS signal according to two inputs, a signal POS2 and a signal PRESSURE VALUE. The signal POS2 is supplied by a position transducer 34 that is connected to the needle to indicate the needle's 19 position. The signal PRESSURE VALUE is supplied by a solid state transducer 36 that controls the magnitude of the PRESSURE VALUE signal in proportion to the difference between the static and pitot pressures, which are applied to the transducer from the pitot tube 10 over the conduits or lines 11. Electrical power PWR is applied to all the components, but for simplicity is shown applied only to the signal processor and the clutch. The signal processor tests the power condition to control the ON/OFF state of the CCL signal, although obviously if there is a complete failure the CCL signal will disappear, disengaging the motor 24 from the needle 18. All the components within the dotted lines 40 may be mounted inside the typical cylindrical airspeed indicator head, which is mounted in the assumed aircraft dash board. During normal operations the needle 18 moves in response to the servo motor 24, the motor overpowering the aneroid mechanism. However, when the signal processor detects a fault (power or needle position) it will switch off the C. CL signal, decoupling the servo motor from the needle 18, allowing the aneroid mechanism to control the needle's position.

Figure 2:
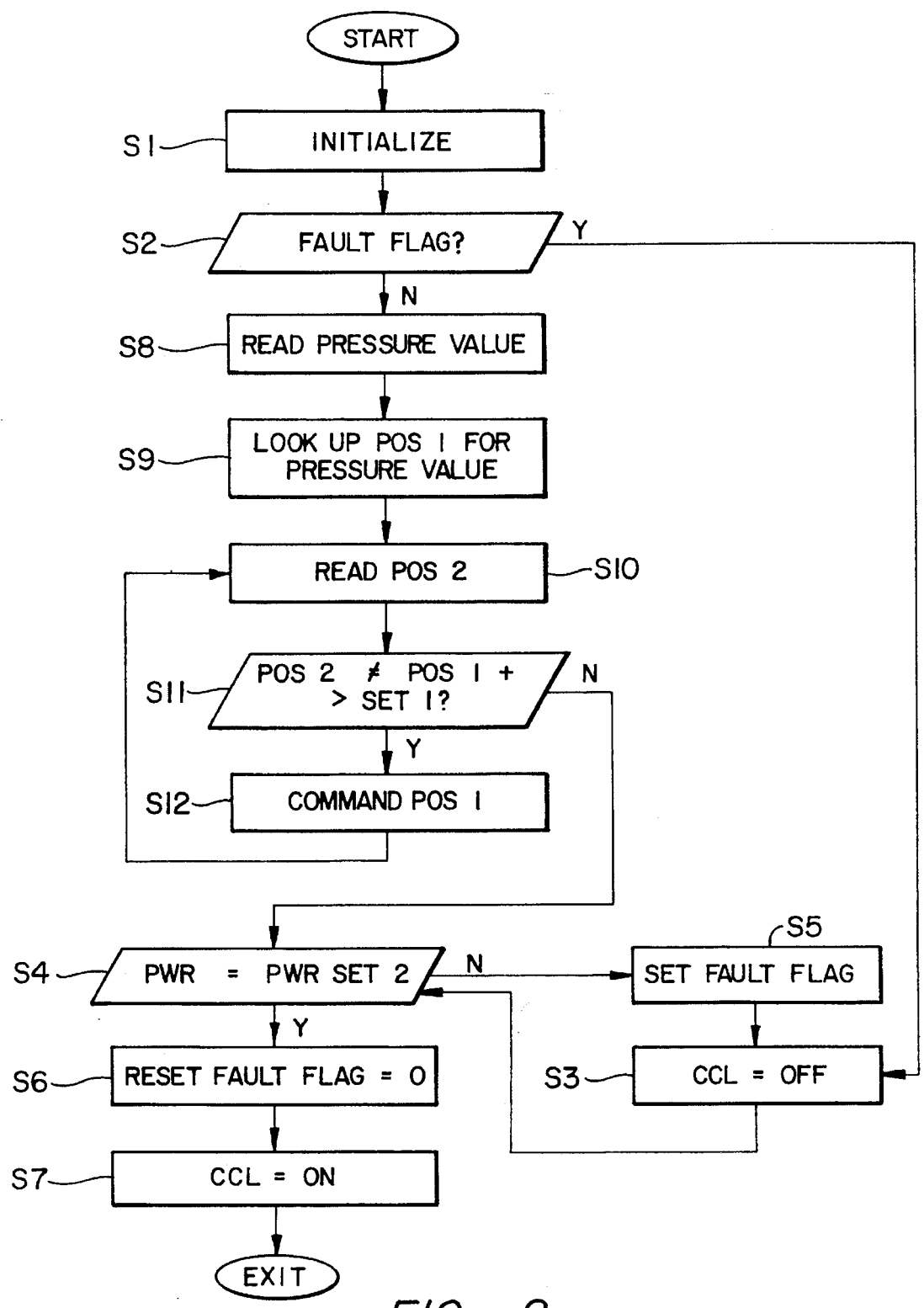
FIG. 2 is a flow-chart showing processing sequences used by a signal processor in the system shown in FIG. 1.

The flow chart in FIG. 2, illustrates processing steps employed by the signal processor 32, which, of course, carries out these sequences millions of time per second. The CPU first initializes in step S1, and in step S2, a test is made to determine if a FAULT flag has been set, an indication from a previous computation cycle that the signal processor 32 detected a fault or error. If the test yields an affirmative answer, the CCL is set to OFF at step S3, from which the process tests the power condition at step S4, which again will set the fault flag at step S5 depending on the results of the test. The test made at step S4 determines if the power condition meets a stored setting (stored in the memory MEM) PWR SET2. If the test is satisfied, the affirmative answer invokes step S6, where the fault flag is reset to zero and CCL is turned ON at step S7. Returning attention to step S2, a negative answer there invokes step S8, where the pressure value signal from the transducer 36 is read. The value for the signal POS 1 is retrieved in step S9. In step S10, the value of the signal POS2 is read. If, in step S11, signal POS2 is not equal to signal POS1 and the difference exceeds a stored value SET1, the resulting affirmative answer invokes step S12, where the POS1 signal is commanded. On the other hand, a negative answer at step S11, which means that the needle is at the correct position for POS1, leads to the test steps that begin at step S4, also entered from step S3 as explained previously. An affirmative answer at step S4 leads to step S6, resetting the FAULT flag (e.g., to zero) and then step S7, setting to ON the signal CCL, allowing the servo 24 to control pointer 19 position.

With the benefit of the foregoing discussion, one of ordinary skill in the art may be able to make modifications, in whole or in part, to a described embodiment of the invention without departing from the true scope and spirit of the invention.

We claim:

1. An airspeed indicator having needle connected to an aneroid drive responsive to static and pitot pressure, comprising by:

first means, electrically operable by a first signal, for transmitting an input force to the needle to overriding the aneroid means;

second means responsive to a position signal for providing said force to the first means; and signal processing means for providing the position signal, as a function of the static and pitot pressure and a feedback signal indicating needle position, to position the needle at a particular location to indicate an airspeed computed for said static and pitot pressure from stored values and for providing the first signal if one or more stored tests are satisfied.

2. The airspeed indicator described in claim 1, further characterized in that one of said tests is that electrical power is sufficient.

3. The airspeed indicator described in claim 2, further characterized in that one of said tests is that said indicated airspeed is within a stored range for an airspeed value for said position signal.

4. The airspeed indicator described in claim 1, further characterized in that the first means comprises an electrical clutch and the second means comprises a servo motor with an output shaft coupled through the clutch to the needle.

5. The airspeed indicator described in claim 3, further characterized in that the first means comprises an electrical clutch and the second means comprises a servo motor with an output shaft coupled through the clutch to the needle.

6. The airspeed indicator described in claim 5, further characterized by:

a solid state transducer for providing electrical signals to the signal processor indicating said static and pitot pressure.

* * * * *